(12) United States Patent
Henry

(10) Patent No.: US 7,228,336 B2
(45) Date of Patent: Jun. 5, 2007

(54) METHODS AND APPARATUSES FOR ARCHIVING DATA PROCESSED BY A DIGITAL SENDER DEVICE

(76) Inventor: Steven G. Henry, 3124 Appaloosa Ct., Fort Collins, CO (US) 80526

( * ) Notice: Subject to any disclaimer, the term of this patent is extended or adjusted under 35 U.S.C. 154(b) by 715 days.

(21) Appl. No.: 10/087,121

(22) Filed: Feb. 28, 2002

(65) Prior Publication Data

US 2003/0172117 A1    Sep. 11, 2003

(51) Int. Cl.
*G06F 15/00* (2006.01)
*G06F 3/00* (2006.01)

(52) U.S. Cl. .............. 709/206; 358/1.15; 358/468; 358/400; 358/207.99; 710/14; 710/20; 707/9; 707/200

(58) Field of Classification Search .............. 709/206, 709/212, 217, 219; 707/10, 200–205, 500; 710/52, 1, 14, 20; 358/1.15, 342, 426, 400, 358/468; 711/113; 348/61–64; 715/500, 715/513
See application file for complete search history.

(56) References Cited

U.S. PATENT DOCUMENTS

| | | | |
|---|---|---|---|
| 5,440,401 A * | 8/1995 | Parulski et al. ............. 386/124 |
| 5,813,009 A * | 9/1998 | Johnson et al. ............. 707/100 |
| 6,248,996 B1 | 6/2001 | Johnson |
| 6,269,382 B1 * | 7/2001 | Cabrera et al. ............. 707/204 |
| 6,456,704 B1 | 9/2002 | Buck |
| 6,591,312 B1 | 7/2003 | Greaves |
| 6,624,843 B2 * | 9/2003 | Lennon ....................... 348/61 |
| 6,658,472 B1 | 12/2003 | Greaves |
| 6,704,118 B1 * | 3/2004 | Hull et al. ................. 358/1.15 |
| 6,747,754 B1 * | 6/2004 | Iyoki ......................... 358/1.15 |
| 6,779,030 B1 * | 8/2004 | Dugan et al. ............... 709/223 |
| 6,810,404 B1 * | 10/2004 | Ferguson et al. ........... 707/200 |
| 6,823,365 B1 | 11/2004 | Mattis |
| 6,880,091 B1 | 4/2005 | Mattis |
| 6,898,317 B2 | 5/2005 | Struble |
| 6,898,625 B2 | 5/2005 | Henry |
| 6,980,312 B1 * | 12/2005 | Czyszczewski et al. ... 358/1.15 |

* cited by examiner

*Primary Examiner*—David Wiley
*Assistant Examiner*—Jude Jean-Gilles

(57) ABSTRACT

Methods and apparatuses for archiving data processed by digital sender and other like devices are provided. By way of example, a removable data storage media device can be added to a digital sender device. Then the digital sender device will be able to optically scan an object to form corresponding scanned object data, provide recipient address data, generate an outgoing message data using the recipient address data, output the message data, and also store the message data using the removable data storage device.

19 Claims, 2 Drawing Sheets

METHODS AND APPARATUSES FOR ARCHIVING DATA PROCESSED BY A DIGITAL SENDER DEVICE

TECHNICAL FIELD

The present invention relates generally to computing and communication devices, and more particularly to methods and apparatuses for archiving data processed by a digital sender device.

BACKGROUND

Electronic messaging, such as, sending and receiving electronic mail (e-mail) continues to grow in popularity. There is growing list of devices that can be used to send and/or receive e-mail. It is not uncommon, for example, to find e-mail being exchanged between users of personal computers (PCs) and users of mobile telephones/pagers.

A more recent development has been the introduction of devices sometimes referred to as digital senders and/or multiple function peripherals. Digital sender devices basically allow users to send e-mail to one or more other users by entering the other user(s) e-mail addresses and/or selecting a defined list of recipients. The user then scans one or more documents using the digital sender device. The digital sender then forwards a digital representation of the scanned documents to the listed recipients over an interconnecting network.

Digital sender devices such as this are useful, for example, in offices, conference rooms, business centers, home offices, schools, and the other like settings where it would be beneficial to enable users to quickly send e-mails without requiring a more extensive computing arrangement. Digital senders can be especially useful to visitors that may not have the ability to access local computing networks, etc.

Multiple function peripheral devices often include the capabilities of digital sender devices along with other features, such as, for example, printing.

Users of conventional digital sender devices, multiple function devices, and other like devices/appliances would likely find it beneficial to be able to archive at least a portion of the data that is processed and/or sent by the device. Consequently, there is a need for improved methods and apparatuses that can provide such a capability.

SUMMARY

The present invention provides methods and apparatuses for archiving data processed by a digital sender device.

The above stated needs and others are met, for example, by a method that includes operatively coupling a removable data storage media to a digital sender device. Then, causing the digital sender device to optically scan at least one object to form corresponding scanned object data, provide recipient address data, and generate an outgoing message data using the recipient address data. The message data includes at least a portion of the scanned object data. The digital sender then outputs the message data, and also stores the message data on the removable data storage device.

In certain implementations the scanned object data further includes a plurality of different versions of the scanned object data. For example, the different versions of the scanned object data may include different resolution versions, and/or various compressed and non-compressed versions. The method may then include causing the digital sender device to output the one version of the scanned object data within the message data and causing the digital sender device to store a different version on the removable data storage device. Hence, for example, a low resolution version of the scanned object data may be attached to an electronic mail (e-mail) message, while a higher resolution version is stored on the removable data storage device.

The message data may include, for example, scanned object data, recipient address data, timestamp data, authentication related data, device identifying data, control data, text data, graphics data, image data, and the like.

The above stated needs and others are also met by an apparatus that includes a digital sender device. The digital sender device includes a data storage device that uses removable data storage media, a scanning mechanism that produces scanned object data, a communication interface that can be connected to at least one network, a user interface that receives user inputs, and logic that operatively connects and controls these mechanisms. The logic is configured to combine recipient address data from the user interface with at least a portion of the scanned object data to form message data that is then output by the communication interface and stored by the data storage device on the removable data storage device.

In certain implementations, the digital sender device is part of a multiple function device that also includes a printer mechanism that is operatively coupled to the logic within the digital sender device. Thus, for example, the logic can be configured to cause the printing mechanism to print out at least a portion of the message data.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
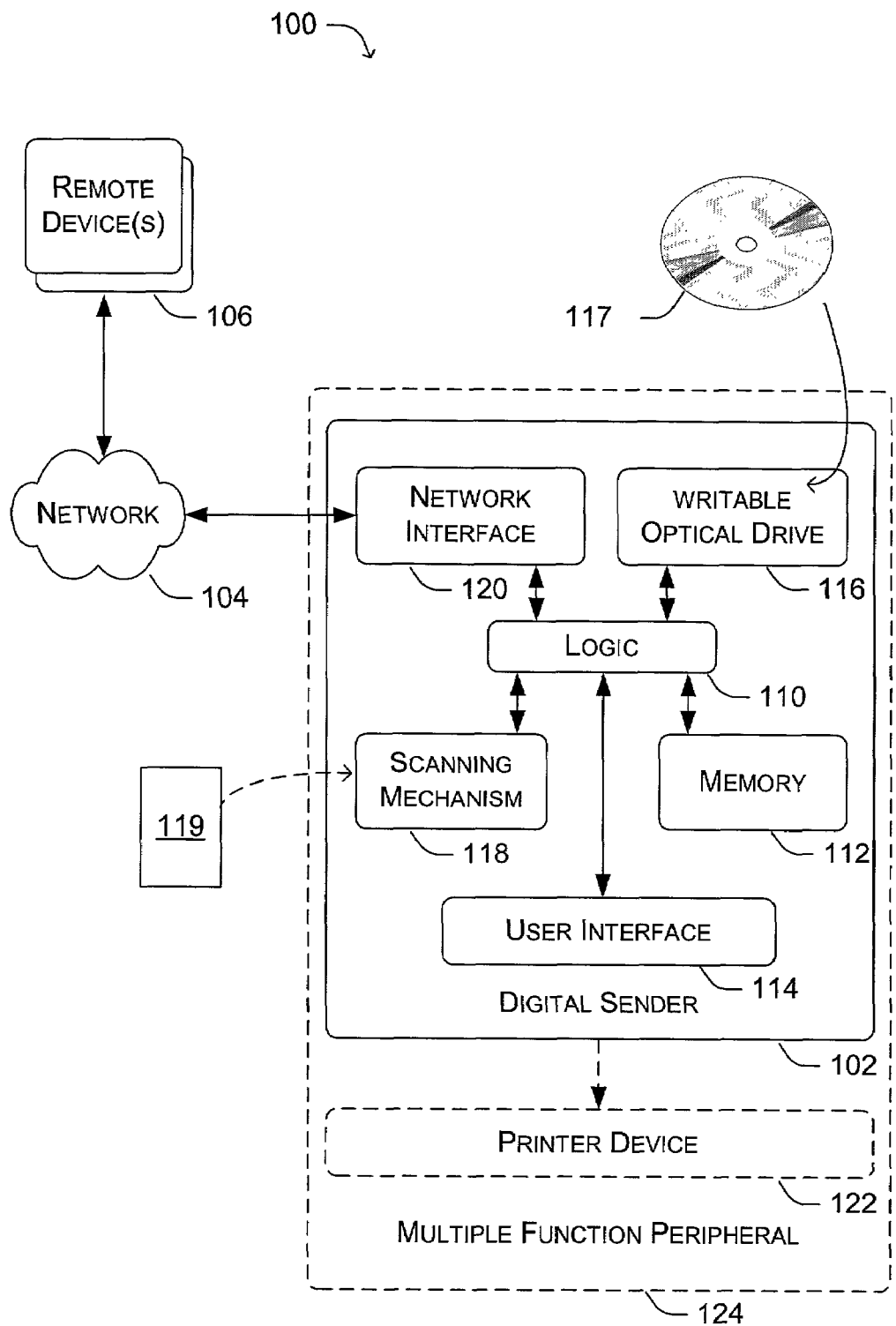
FIG. 1 is a block diagram depicting a computing and communication environment that includes a digital sender device having a writable optical disc drive suitable for archiving data processed by the digital sender device on one or more removable optical discs, in accordance with certain exemplary implementations of the present invention.

FIG. 1 is a block diagram depicting an exemplary computing and communication environment 100 having a digital sender device 102 that is connected to a network 104, which is further connected to one or more remote devices 106. Digital sender device 102 is also illustrated as being configured with a writable optical drive 116 that accepts a writable optical disc 117 that can be used to archive data processed by digital sender device 102, in accordance with certain exemplary implantations of the present invention. It is recognized that other types of removable writable mass storage devices may be used instead of drive 116 and disc 117. For example, magnetic drives and media may be used, or portable solid-state memory arrangements may be used. Although not shown in FIG. 1, digital sender device 102 may also include a hard drive for locally storing information.

Network 104 is representative of one or more communication links, either wired or wireless that are capable of carrying data between digital sender 102 and at least one remote device 106. In certain exemplary implementations, network 104 includes a local area network (LAN), a wide area network (WAN), an intranet, the Internet, or other similar network.

Here, digital sender device 102 is configured to allow a user to scan an object(s) 119, such as, e.g., a document, and send the resulting scanned object data out over network 104 to one or more remotes devices 106 in the form of message data. The message data may, for example, include electronic mail (i.e., e-mail) message data from the user of the digital sender device to the user(s) of the remote device(s). Here, an e-mail message would include the scanned object data in some manner.

For example, the scanned object data may be included in the e-mail message data as an attached file. The scanned object data may include Portable Document Format (PDF) formatted data, tagged image file format (TIFF) formatted data, Joint Photographic Experts Group (JPEG) formatted data, bit-map formatted data, optical character recognition (OCR) related data, American Standard Code for Information Interchange (ASCII) formatted data, and/or other forms of encoded data, including, e.g., encrypted data, etc.

Digital sender 102 includes a user interface 114 that is configured to allow the user to input information and/or make selections associated with the operation of digital sender device 102 and/or the preparation of the message data. By way of example, user interface 114 may include a keypad or keyboard and/or display (not shown). The display, for example, may include a liquid crystal display (LCD) or the like. In certain implementations the display may include a touch-screen input/output device.

Thus, with user interface 114 the user can be prompted to enter user input data, such as, e.g., the recipient(s) e-mail address information, the subject of the e-mail, the text or body of the e-mail, etc.

As described in greater detail below, in accordance with certain other aspects of the present invention, digital sender device 102 may be configured to store a copy of the message data and/or other data that is processed by digital sender device 102 onto disc 117.

In accordance with still other aspects of the present invention, digital sender device 102 may be included within a multiple function peripheral (MFP) device 124. As its name implies, MFP device 124 is configured to provide multiple functions. In this example, the functions provided by MFP device 124 include those provided by digital sender device 102 and a printer device 122. Consequently, the user of digital sender device 102 and/or portable device 108 may also print out a hardcopy of any applicable portions of the message data.

To accomplish the various exemplary tasks as described above and others, digital sender 102 includes logic 110, which is operatively coupled to memory 112, a user interface 114, writable optical disc drive 116, a scanning mechanism 118, and at least one network interface 120. When included in MFP device 124, logic 110 would also be operatively coupled to printer device 122, for example.

Logic 110 is representative of any hardware, firmware and/or software that is configured to perform certain functions associated with the operation of digital sender 102 and, if applicable, MFP 124. Hence, as those skilled in the art will recognize, logic 110 may include dedicated logic and/or one or more processors configured in accord with software instructions, for example.

Memory 112 is representative of any type of data storage mechanism that can be accessed by at least logic 110. Memory 112 may therefore include, for example, some form of random access memory (RAM), some form of read only memory (ROM), and/or other like solid-state data storage mechanism.

Scanning mechanism 118 is representative of any optical scanner technology that may be employed to produce scanned object data upon scanning an object. Such scanning technologies are well known. The resulting scanned object data is provided to logic 110 and/or stored in memory 112 or onto disc 117.

Network interface 120 is representative of any communication technology that allows data to be shared between logic 110 and/or memory 112 and network 104. Such communication technology is well known.

Writable optical disc drive 116 is representative of any type of mass data storage device. In this example, writable optical storage drive 116 may include, for example, a CD-R drive, CD-RW drive, DVD-RAM drive, ZIP drive, solid-state memory reader, or other like device. Disc 117 is representative of any type of removable data storage media suitable for use with drive 116. For example, disc 117 may include a CD-R disc, CD-RW disc, DVD-RAM disc, ZIP disk cartridge, non-volatile memory device, or other like media/device.

With this in mind, digital sender device 102 is configured to store data onto disc 117. The data that is archived in this manner may vary from user to user. In accordance with certain implementations of the present invention, for example, logic 110 may be configured to archive outgoing message data by simply adding/appending the message data as a file to disc 117. As such, a user may carry an archival disc 117 with them. The user would insert his/her archival disc into optical drive 116 upon using digital sender 102.

In addition to archiving data, logic 110 may also be configured to allow the user to selectively retrieve data, e.g., data files, from disc 117. The files on disc 117 may have been stored by digital sender device 102, another digital sender device, and/or another compatible computing device (not shown), such as, e.g., a personal computer (PC), etc. Digital sender device 102 could then be used to generate and send message data based on the retrieved data. For example, a retrieved data file may be attached to or otherwise incorporated in an outgoing electronic mail. The retrieved data may also include recipient address data, such as, e.g., a distribution list, that can be used by logic 110 in addressing an outgoing electronic mail, or the like.

If part of a multiple function device 124, then logic 110 may also be configured to allow the user to print at least a portion of the retrieved data.

In accordance with certain aspects of the present invention, logic 110 and disc 117 are also configured to provide a security capability that can be used to prevent or otherwise deter other users from using and/or accessing the data stored on disc 117. Thus, for example, user credentials or other like data may be included on disc 117 and used by logic 110 to verify that the user has permission to access data stored on disc 117. For example, upon inserting disc 117 the user may be prompted by logic 110, via user interface 114, to provide a username and/or password or passcode that is required to essentially "unlock" the archived data. Similarly, in certain implementations, the archived data may be encrypted to provide an increased level of security. Here, logic 110 may be configured to decrypt the archived data upon authenticating the user in same manner. If a public/private key pair and/or other like security token feature/function are used, then in certain implementations rather than having the user manually input data, logic 110 may include a smart card reader (not shown) or the like, which can accept a smart card or other like portable token device that authenticates the user and/or otherwise supports the security functions of logic 110. These and other similar data security technologies are well known.

In accordance with certain exemplary implementations of the present invention, the archived data may include, for example, message data, scanned object data, address data, time/date data, authentication related data, and/or data relating to and/or identifying the digital sender device.

In accordance with certain other exemplary implementations of the present invention, logic 110 may be configured to allow the user to scan an object and then based on the resulting scanned object data selectively send and store different versions of the scanned object data. By way of example, the scanned object data may be a significantly large data file when the scanned object is physically large, graphically complex, and/or the resolution of scanning mechanism 118 is set to a high level. Here, the user may decide to send a lower resolution version of the scanned object data, but archive the higher resolution scanned object data. As such, logic 110 and/or scanning mechanism 118 may be configured to reduce the amount of data that is to be sent, for example, by selectively removing data from the scanned object data and/or compressing the scanned object data. Such techniques are well known.

In other exemplary implementations, a user may decide to send a grayscale version of the scanned object data and archive a color version. In other situations, a user may decide to send a binary (black/white) version of text data as opposed to a more data rich gray scale or color text data.

Logic 110 may also be configured to format a new disc 117 when a user first inserts it into optical disc drive 116.

Figure 2:
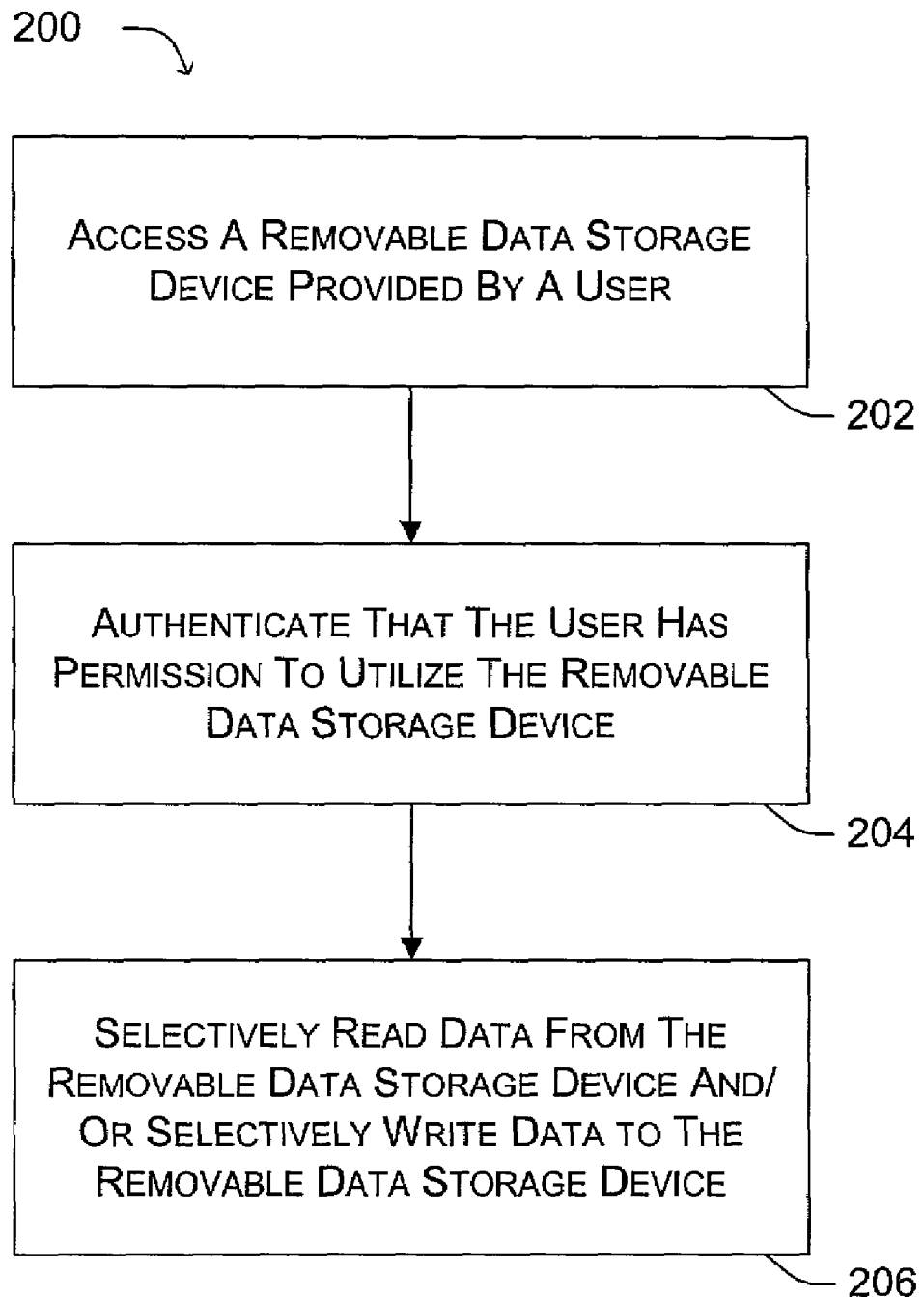
FIG. 2 is a flow diagram depicting a method for use in a computing and communication environment having a digital sender device as in FIG. 1, for example, in accordance with certain exemplary implementations of the present invention.

By way of further example, a flow diagram is depicted in FIG. 2 to illustrate certain exemplary functions that can be performed using logic 110 and the other resources in digital sender 102. Here, a process 200 is provided.

In step 202, a user inserts or otherwise provides digital sender device 102 with a removable data storage device, e.g., disc 117. Digital sender device 102 then accesses at least a portion of the data stored on disc 117. In step 204, which is optional, the user is authenticated or otherwise verified as being able to use disc 117. In step 206, digital sender device 102 accesses disc 117 as needed to read data there from and/or write data thereto.

Thus, although some preferred embodiments of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method for use with a unitary device, the method comprising:
   with a unitary device comprising therein logic, a user interface, a scanning mechanism, a communication interface, and a removable data storage mechanism, wherein said logic is operatively coupled to said user interface to receive an inputted recipient electronic mail address, to said scanning mechanism to receive at least scanned object data obtained by optically scanning an object, to said communication interface to send an electronic mail message that includes at least a portion of said scanned object data to a remote device associated with said recipient electronic mail address, and to said removable data storage mechanism to access therethrough a removable data storage media when present:
      receiving a removable data storage media in said removable data storage mechanism;
      selectively operatively coupling said removable data storage media to said logic; and
   storing at least an archival copy of at least said electronic mail message data sent via the communication interface on said removable data storage media, and wherein said scanned object data further includes a plurality of different versions of said scanned object data, said plurality of different versions of said scanned object data includes a first resolution version and a second resolution version, said second resolution version having a lower level of resolution than said first resolution version.

2. The method as recited in claim 1, wherein said removable data storage media is a writable optical disc.

3. The method as recited in claim 1, wherein said portion of said scanned object data includes said second resolution version.

4. The method as recited in claim 1, wherein said portion of said scanned object data includes said first resolution version.

5. A method for use with a unitary device, the method comprising:
   with a unitary device comprising therein logic, a user interface, a scanning mechanism, a communication interface, and a removable data storage mechanism, wherein said logic is operatively coupled to said user interface to receive an inputted recipient electronic mail address, to said scanning mechanism to receive at least scanned object data obtained by optically scanning an object, to said communication interface to send an electronic mail message that includes at least a portion of said scanned object data to a remote device associated with said recipient electronic mail address, and to said removable data storage mechanism to access therethrough a removable data storage media when present:
      receiving a removable data storage media in said removable data storage mechanism;
      selectively operatively coupling said removable data storage media to said logic; and
   storing at least an archival copy of at least said electronic mail message data sent via the communication interface on said removable data storage media, and wherein said scanned object data further includes a plurality of different versions of said scanned object data, said plurality of different versions of said scanned object data includes a first version and a second version, said second version being a data compressed version of said first version.

6. The method as recited in claim 5, wherein storing an archival copy of said at least the electronic mail message data sent via the communication interface on said removable data storage media further includes:
   storing at least two of said plurality of different versions of said scanned object data.

7. The method as recited in claim 1, wherein said electronic mail message data further includes at least one type of data selected from a group of types of data comprising timestamp data, authentication related data, device identifying data, control data, text data, graphics data, and image data.

8. A unitary device comprising:
   a data storage mechanism configurable to access a removable data storage media, an optical scanning mechanism configurable to optically scan at least one object and produce corresponding scanned object data, a communication interface configurable to operatively connect to at least one other device over at least one network, a user interface configurable to receive user inputs, and logic operatively coupled to said data storage mechanism, said optical scanning mechanism, said communication interface, and said user interface, wherein said logic is configured to combine recipient electronic mail address data received through said user interface with at least a portion of said scanned object data to form electronic mail message data that is then output by said communication interface, and wherein said logic is further configured to selectively archive at least a portion of said electronic mail message data by providing said portion of said electronic mail message to said data storage mechanism for storage on said removable data storage device, and wherein said scanned object data further includes a plurality of different versions of said scanned object data, said plurality of different versions of said scanned object data includes a first resolution version and a second resolution version, said second resolution version having a lower level of resolution than said first resolution version.

9. The unitary device as recited in claim 8, wherein said logic is configured to include said second resolution version within said electronic mail message data that is output by said communication interface.

10. The unitary device as recited in claim 8, wherein said logic is configured to include said first resolution version within said portion of said electronic mail message data that is stored by said data storage mechanism.

11. A unitary device comprising:
a data storage mechanism configurable to access a removable data storage media, an optical scanning mechanism configurable to optically scan at least one object and produce corresponding scanned object data, a communication interface configurable to operatively connect to at least one other device over at least one network, a user interface configurable to receive user inputs, and said logic operatively coupled to said data storage mechanism, said optical scanning mechanism, said communication interface, and said user interface, wherein said logic is configured to combine recipient electronic mail address data received through said user interface with at least a portion of said scanned object data to form electronic mail message data that is then output by said communication interface, and wherein said logic is further configured to selectively archive at least a portion of said electronic mail message data by providing said portion of said electronic mail message to said data storage mechanism for storage on said removable data storage device, and wherein said scanned object data further includes a plurality of different versions of said scanned object data, said plurality of different versions of said scanned object data includes a first version and a second version, said second version being a data compressed version of said first version.

12. The unitary device as recited in claim 11, wherein said logic is configured to include said second version within said electronic mail message data that is output by said communication interface.

13. The unitary device as recited in claim 11, wherein said logic is configured to include said first version within said portion of said electronic mail message data that is stored by said data storage mechanism.

14. The unitary device as recited in claim 8, wherein said electronic mail message data further includes at least one type of data selected from a group of types of data comprising timestamp data, authentication related data, device identifying data, control data, text data, graphics data, and image data.

15. The unitary device as recited in claim 8, further comprising:
a printer mechanism operatively coupled to said logic, and wherein said logic is further configured to cause said printing mechanism to print out at least a portion of said electronic mail message data.

16. The method as recited in claim 1, further comprising:
causing said logic to verify that access permission exists prior to storing at least said electronic mail message data on said removable data storage media based on inputted data received via said user interface.

17. The method as recited in claim 5, wherein said removable data storage media is a writable optical disc.

18. The method as recited in claim 5, further comprising:
causing said logic to verify that access permission exists prior to storing at least said electronic mail message data on said removable data storage media based on inputted data received via said user interface.

19. The unitary device as recited in claim 11, further comprising:
a printer mechanism operatively coupled to said logic, and wherein said logic is further configured to cause said printing mechanism to print out at least a portion of said electronic mail message data.

* * * * *

UNITED STATES PATENT AND TRADEMARK OFFICE
CERTIFICATE OF CORRECTION

PATENT NO.         : 7,228,336 B2                                    Page 1 of 1
APPLICATION NO.    : 10/087121
DATED              : June 5, 2007
INVENTOR(S)        : Steven G. Henry It is certified that error appears in the above-identified patent and that said Letters Patent is hereby corrected as shown below:

In column 7, line 45, in Claim 11, delete "said" before "logic".

Signed and Sealed this

Eleventh Day of August, 2009

David J. Kappos
*Director of the United States Patent and Trademark Office*